United States Patent [19]

Brown

[11] 4,123,821

[45] Nov. 7, 1978

[54] SELF LOCKING DOOR OPENING DEVICE AND ASSEMBLY

[75] Inventor: Harold B. Brown, Livonia, Mich.

[73] Assignee: Burroughs Corporation, Detroit, Mich.

[21] Appl. No.: 847,398

[22] Filed: Oct. 31, 1977

[51] Int. Cl.$^2$ ........................ A47B 95/02; A47J 45/07; B65D 25/28; E05B 1/00

[52] U.S. Cl. .................................... 16/114 R; 16/125; 190/58 R; 220/94 R; 312/320

[58] Field of Search ............. 16/114 R, 125, DIG. 19, 16/DIG. 24, DIG. 25; 312/244, 320; 220/94 R; 229/52 A; 190/57, 58 R; 49/460

[56] References Cited

U.S. PATENT DOCUMENTS

| | | | |
|---|---|---|---|
| 2,315,457 | 3/1943 | Schuh | 16/125 |
| 2,615,226 | 10/1952 | Kral | 16/114 R |
| 3,621,510 | 11/1971 | Rollins, Jr. | 16/114 R |
| 3,727,265 | 4/1973 | Camp | 16/125 |
| 3,793,674 | 2/1974 | Kneier | 190/58 R |

FOREIGN PATENT DOCUMENTS

| | | | |
|---|---|---|---|
| 1,020,266 | 2/1966 | United Kingdom | 312/320 |

*Primary Examiner*—James Kee Chi
*Attorney, Agent, or Firm*—Robert L. Kaner; David R. Syrowik; Carl Fissell, Jr.

[57] ABSTRACT

A self locking door opening device and assembly are provided, the door having an aperture extending therethrough. The assembly includes a grip and a retainer latch. The grip includes a pair of side walls and a base member from which the side walls extend. A top wall interconnects the side walls. The retainer latch comprises a flexible elongated clip having a pair of ends and a central portion. The grip is secured in a locked position by the clip when the clip is disposed in a longitudinal passage defined by the side walls and the top wall. In this locked position the periphery of the door about the aperture is disposed between the ends of the clip and the base member while the central portion of the clip flexes to abuttingly engage the top wall. A pair of projections extend from the top surface of the clip. The top wall of the grip is disposed between the projections and abuttingly engages the projections and the central portion to secure the grip in the locked position.

3 Claims, 4 Drawing Figures

SELF LOCKING DOOR OPENING DEVICE AND ASSEMBLY

BACKGROUND OF THE INVENTION

1. Field of the Invention

This invention relates in general to door opening devices and in particular to door opening devices which can be inserted through an aperture in a door and locked in position.

2. Description of the Prior Art

In constructing a door, means are usually provided for opening the door, such as a handle, a finger grip, etc. Some doors require a means for opening the door without an attendant projecting handle, knob or hand grip. As the result, the need exists for doors which have their gripping surface interiorly the door. In other words, to open the door, one must place his fingers or hand through an aperture formed in the door to reach the gripping surface.

There is an ever present need therefore to construct a door opening device which can be inserted through an aperture in a door to provide a gripping surface. It is important that this device be inexpensive, simple and easy to assemble about the door aperture. It would be most advantageous if this device comprised as few parts as possible without the need for an adhesive, which adhesive would further complicate the assembly process.

An assembly for use with the door having an interior surface and an exterior surface is provided. The door has an aperture extending therethrough the door, thereby placing the exterior surface in fluid communication with the interior surface. The assembly, constructed in accordance with the instant invention, comprises gripping means for providing a gripping surface interiorly the door and latching means for securing the gripping means to the door. The gripping means has a gripping surface extending therethrough the aperture. The latching means secures the gripping means to the door in a locked position when the periphery of the door about the aperture is disposed between portions of the latching means.

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
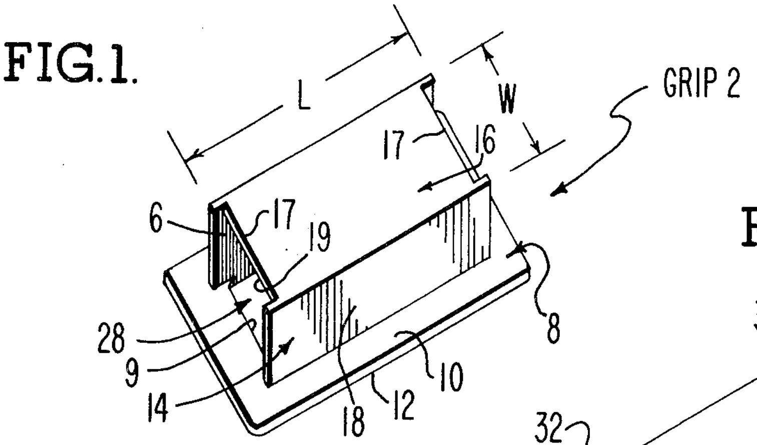
FIG. 1 is a perspective view of a first part of the door opening device.
Figure 2:
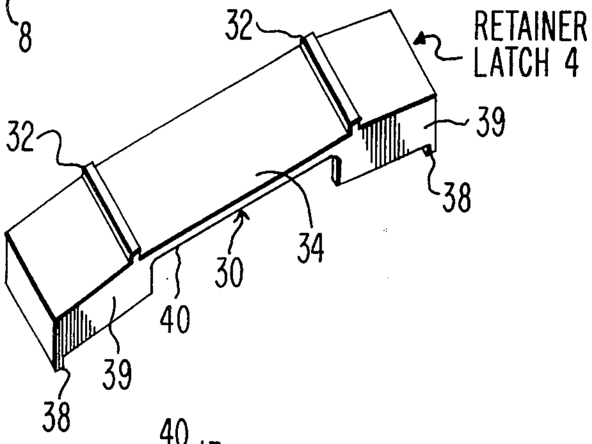
FIG. 2 is a perspective view of a second part of the door opening device.
Figure 3:
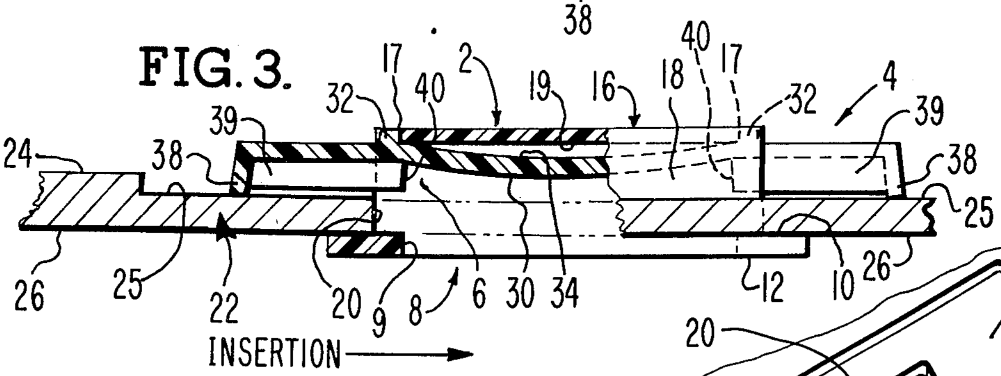
FIG. 3 is a side elevational view of the device in its locked position, partially broken away and partially in cross section about the periphery of the aperture formed through the door.
Figure 4:
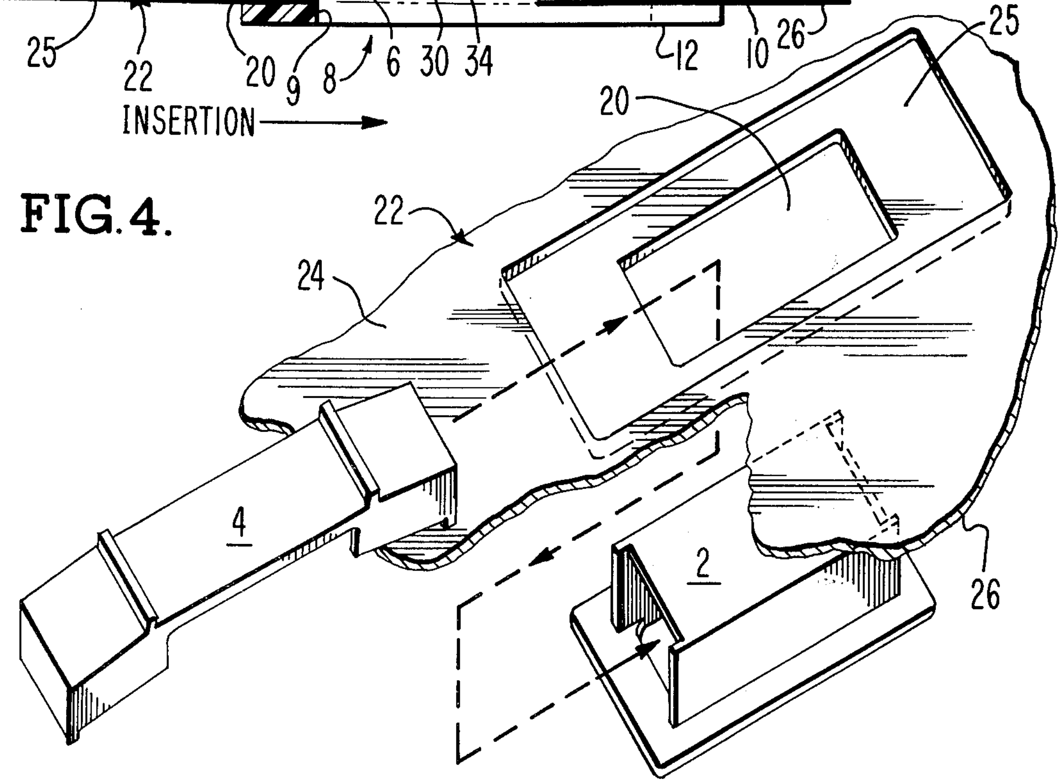
FIG. 4 is a perspective view of the door opening device and how it is assembled with the door to provide a gripping surface interiorly the door.

The two parts of the self locking door opening device of the present invention are shown in FIGS. 1 and 2. The device consists of two integrally molded plastic parts. A door opening grip 2 is shown in FIG. 1 and a retainer latch 4 is shown in FIG. 2. The grip 2 includes a three-sided rectangular member or gripping means generally indicated at 14 for providing a gripping surface interiorly a door or door panel generally indicated at 22 as shown in FIGS. 3 and 4 when the grip 2 is inserted through an aperture 20 in the door panel 22. The length L and the width W of the rectangular member 14 are slightly smaller than the length and width of the slot 20 which is also rectangular, such that when the grip 2 is inserted through the aperture 20, the rectangular member 14 slidably fits in the aperture 20.

The grip 2 also includes a base member generally indicated at 8 which is integrally molded with the rectangular member 14 to define the grip 2. The base member 8 has an opening 9 extending therethrough to allow the gripping surface 6 of the grip 2 to be in fluid communication with the exterior surface 26 of the door panel 22 as shown in FIG. 3, (after the grip 2 has been inserted through the aperture 20).

The base member 8 includes a top surface 10 and a bottom surface 12. After the insertion, the top surface 10 abuttingly engages the exterior surface 26 of the door panel 22 at the periphery of the door 22 about the aperture 20. As shown in FIG. 3, the bottom surface 12 of the grip 2 is seen from the exterior of the door 22.

The rectangular member 14 comprises a pair of side walls 18 which extend substantially perpendicular from the base member 8 immediately adjacent the opening 9. An extending means or a top wall generally indicated at 16 interconnects the side walls 18 to define the rectangular member 14. A longitudinal passage 28 that extends the length of the member 14 is defined by the inside surfaces 6 of the side walls 18 (only one shown) and the bottom surface 19 of the top wall 16.

After the grip 2 has been inserted through the slot 20, the retainer latch 4 is slid through the longitudinal passage 28 as shown in FIG. 4. The retainer latch or clip 4 is resilient to bend at its central portion, generally indicated at 30, to allow the retainer latch 4 to slide all the way through the longitudinal passage 28 along the inner surface 24 of the door 22 until the opposite ends 38 of the latch 4 are disposed on either side of the top wall 16. The clip 4 includes a pair of projections 32 extending from the top surface 34 of the clip 4. When the grip 2 is in its locked position, the projections 32 are positioned within a pair of cutouts 17 at opposite ends of the top wall 16. As shown in FIG. 3, the central portion 30 of the retainer latch 4 bends downward in the direction of the aperture 20 in the door 22 to supply a springing force at the ends 38 of the retainer latch 4, which ends are urged against the inner surface 24 in a depression 25 formed in the inner surface 24. At the same time, the central portion 34 of the retainer latch 4 pushes upward on the bottom surface 19 of the top wall 16 to urge the base member 8 against the outer surface 26 of the door 22. The projections 32 which are disposed within the cutouts 17 secure the rectangular member 14 by abuttingly engaging the opposite ends of the top wall 16 in the locked position.

The retainer latch 4 includes a pair of spaced apart side walls 39 integrally molded therewith the central portion 34 and the ends 38 of the retainer latch 4. The side walls 39 each have a side port 40 extending between the ends 38 and adjacent the central portion 34. When the retainer latch 4 is in its locked position, the side ports 40 allow one to contact the inside surfaces 6 of the grip 2 when attempting to open the door 22. The side ports 40 further allow the latch 4 to flex to greater degree at the central portion 34.

As shown in FIG. 3, a person wishing to open the door 22 would merely grip one or both of the inside surfaces 6 of the grip 2 with their finger tips and push on one of the inside surfaces 6 if the door 22 is a sliding door or use the friction generated between the person's fingertips on the inside surface 6 to swing the door outward towards the person or downward as shown in FIG. 3.

The base member 8 and the retainer latch 4 define a latching means for securing the gripping means or rectangular element 14 to the door 22.

The invention has been described in an illustrative manner and it is to be understood that the terminology which has been used is intended to be in the nature of words of description rather than of limitation.

Obviously, many modifications and variations of the present invention are possible in light of the above teachings. It is therefore to be understood that within the scope of the appended claims the invention may be practiced otherwise than as specifically described.

The embodiments of the invention in which an exclusive property or privilege is claimed are defined as follows:

1. An assembly for use with a door having an interior surface and an exterior surface, the door having an aperture extending therethrough the door, thereby placing the exterior surface in fluid communication with the interior surface, said assembly comprising:

gripping means for providing a gripping surface interiorly the door, said gripping surface defined by a pair of side walls; and said gripping means including extending means extending from one of said side walls toward the other side wall; and latching means for securing said gripping means to said door with the gripping means having a gripping surface extending through the aperture in the door, said latching means securing said gripping means to the door in a locked position, the periphery of the door about the aperture being disposed between portions of said latching means, said latching means comprising a base member connected to said gripping means, said base member having an opening extending therethrough, thereby allowing said gripping surface to be in fluid communication with the exterior surface, said base member extending substantially perpendicular to said side walls, and said base member adapted for abuttingly engaging the exterior surface of the door in said locked position; and a flexible elongated clip having a pair of ends and a central portion, said gripping means being secured in said locked position when said clip is disposed in a longitudinal passageway defined by said side walls and said extending means, the periphery of the door about the aperture being disposed between the ends of said clip and said base member, the central portion of said clip flexing to abuttingly engage said extending means.

2. The assembly as defined in claim 1 wherein said clip includes a pair of projections extending from the top surface of said clip, said extending means being disposed between said projections and abuttingly engaging said projections to secure said gripping means in said locked position.

3. The assembly as defined in claim 2 wherein said extending means comprises a top wall interconnecting said side walls.

* * * * *